(12) United States Patent
Bartel-Lingg et al.

(10) Patent No.: US 11,987,995 B2
(45) Date of Patent: May 21, 2024

(54) FLOORING WITH AT LEAST ONE ELECTRIC COMPONENT AND ELECTRIC COMPONENT FOR FLOORING

(71) Applicant: <BARIT> (R) -Kunstharz-Belagstechnik GmbH, Esslingen (DE)

(72) Inventors: Gabriele Bartel-Lingg, Esslingen (DE); André Bartel, Esslingen (DE); Anne Emely Bartel, Esslingen (DE)

(73) Assignee: <BARIT> (R) -Kunstharz-Belagstechnik GmbH, Esslingen (DE)

( * ) Notice: Subject to any disclaimer, the term of this patent is extended or adjusted under 35 U.S.C. 154(b) by 1252 days.

(21) Appl. No.: 16/482,481

(22) PCT Filed: Feb. 1, 2018

(86) PCT No.: PCT/EP2018/052575
§ 371 (c)(1),
(2) Date: Oct. 1, 2019

(87) PCT Pub. No.: WO2018/141875
PCT Pub. Date: Aug. 9, 2018

(65) Prior Publication Data
US 2020/0095780 A1 Mar. 26, 2020

(30) Foreign Application Priority Data
Feb. 1, 2017 (DE) ...................... 10 2017 102 007.1
Aug. 24, 2017 (DE) ...................... 10 2017 119 425.8

(51) Int. Cl.
*E04F 15/12* (2006.01)
*E04C 5/00* (2006.01)
(Continued)

(52) U.S. Cl.
CPC ................ *E04F 15/12* (2013.01); *E04C 5/00* (2013.01); *E04F 15/18* (2013.01); *G01S 13/74* (2013.01); *G01S 13/876* (2013.01)

(58) Field of Classification Search
CPC .. E04F 15/12; E04F 15/18; E04C 5/00; G01S 13/74; G01S 13/876
See application file for complete search history.

(56) References Cited

U.S. PATENT DOCUMENTS 9,328,520 B1 * 5/2016 Kriser ................... E04F 15/185
11,193,285 B2 * 12/2021 Stillig ............... E04F 15/02405
(Continued)

FOREIGN PATENT DOCUMENTS

DE 20004922 U1 11/2000
DE 102005015050 A1 10/2006
(Continued)

Primary Examiner — Patrick J Maestri
(74) Attorney, Agent, or Firm — Hoffmann & Baron, LLP

(57) ABSTRACT

A flooring as a covering for a subfloor, wherein the flooring includes a layer made from a hardenable material which is hardened when the flooring is in the finished state and in which at least one electric component is embedded, wherein the electric component includes a lower side facing the subfloor when in the mounted position, and an upper side opposite the lower side. It is provided that the at least one electric component includes at least one surface section, in particular the upper side and/or the lower side, an adhesion promoter for the hardenable material and/or at least one recess which extends from its upper side to its lower side.

21 Claims, 6 Drawing Sheets

(51) Int. Cl.
*E04F 15/18* (2006.01)
*G01S 13/74* (2006.01)
*G01S 13/87* (2006.01)

(56) References Cited

U.S. PATENT DOCUMENTS

2011/0291804 A1 12/2011 Chan
2017/0350136 A1* 12/2017 Byrne .................... H02J 50/05

FOREIGN PATENT DOCUMENTS

| DE | 102007030829 A1 | 1/2009 |
| DE | 102008010530 A1 | 8/2009 |
| DE | 102015112214 A1 | 2/2017 |
| WO | 2004076731 A1 | 9/2004 |
| WO | 2007137854 A1 | 12/2007 |
| WO | 2014037324 A2 | 3/2014 |

\* cited by examiner

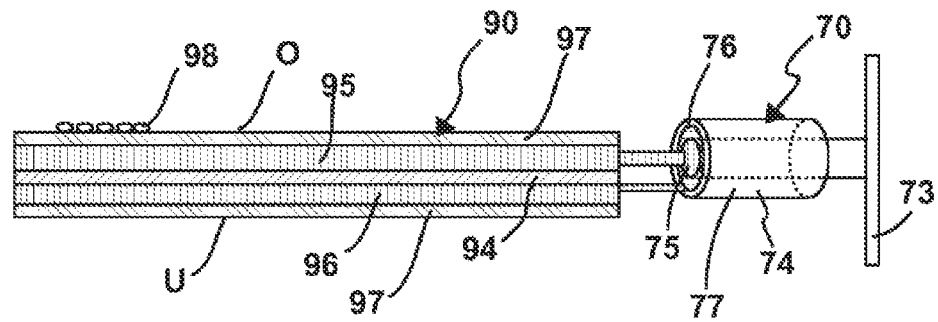
Fig. 10
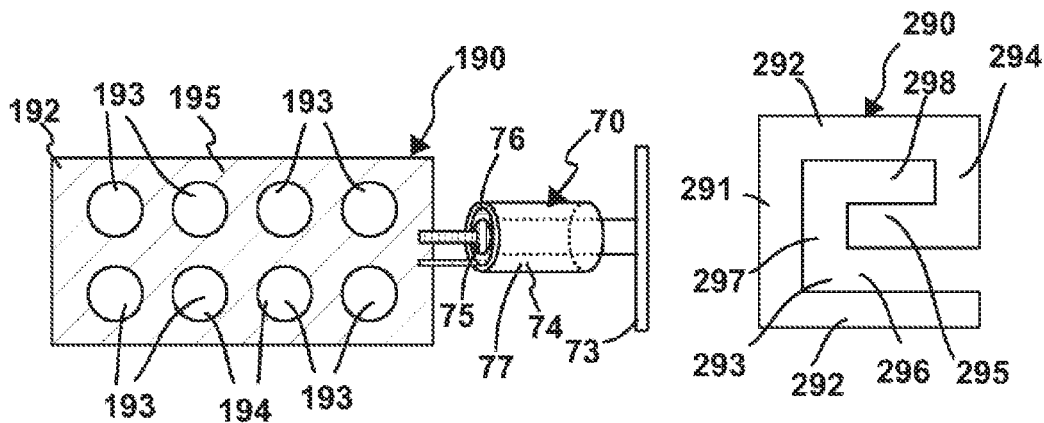
Fig. 11
Fig. 12
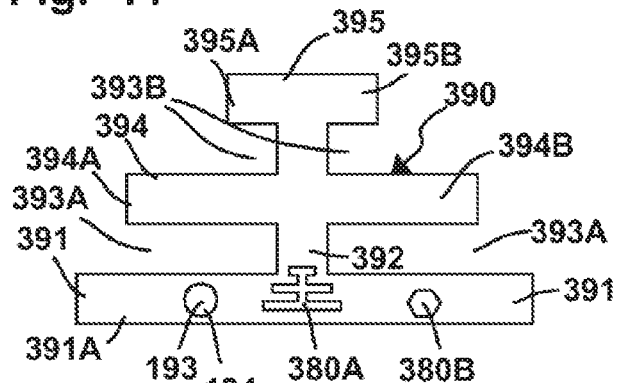
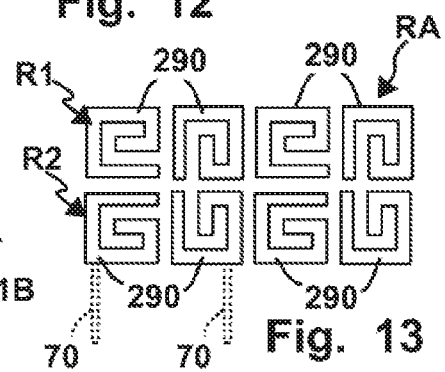
Fig. 13
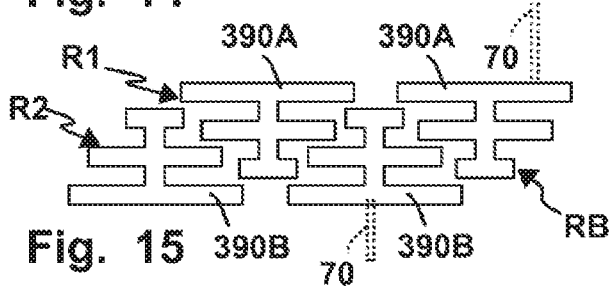
Fig. 14
Fig. 15
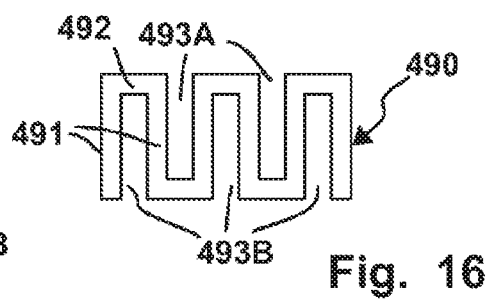
Fig. 16

US 11,987,995 B2

FLOORING WITH AT LEAST ONE ELECTRIC COMPONENT AND ELECTRIC COMPONENT FOR FLOORING

This application claims priority based on an International Application filed under the Patent Cooperation Treaty, PCT/EP2018/052575, filed Feb. 1, 2018, which claims priority to DE102017102007.1, filed Feb. 1, 2017 and DE102017119425, filed Aug. 24, 2017.

BACKGROUND OF THE INVENTION

The invention relates to a flooring as a covering for a subfloor, wherein the flooring comprises a layer made from a hardenable material which is hardened when the flooring is the finished state and in which at least one electric component is embedded, wherein the electric component comprises a lower side facing the subfloor when in the mounted position, and an upper side opposite the lower side.

A flooring of this type is explained, for example, in DE 10 2015 112 214. The electric component is arranged under a reinforcement fabric. The hardenable material encloses the electric component, so that said electric component is embedded in the flooring. However, an optimal hold of the component on the subfloor is not ensured in all situations.

SUMMARY OF THE INVENTION

On the basis of this, the aim of the present invention therefore is to provide an improved flooring.

It is provided that, on at least one surface section, in particular on the upper side and/or lower side, the at least one electric component comprises an adhesion promoter for the hardenable material and/or at least one recess which extends from its upper side to its lower side.

The basic idea of the present invention consists in that the electric component can be better fixed in the flooring and/or on the substrate by means of the adhesion promoter or the recess or both.

Through the at least one recess or the arrangement of multiple recesses, the hardenable material can flow and thus establish a connection bridge between parts of the hardenable material on the upper side of the electric component and, on the other hand, in the region of the lower side of the electric component. In particular, through the recess, the hardenable material can establish a connection between the subfloor, for example, a screed, a concrete floor or the like, and a layer of the hardening material covering the electric component or the electric components.

The electric component itself would be, for example, smooth on its surface. Thus, for example, a lacquer layer or metal layer could be provided. This lacquer layer or metal layer of the electric component is at least partially covered by the adhesion promoter, which establishes a corresponding connection with the hardenable material.

A preferred design provides that the at least one recess is a marginal recess or lateral recess. The recess can also be or comprise a passage opening. It is understood that the electric component can comprise multiple recesses, for example, multiple marginal recesses and/or multiple passage openings. Through a respective passage opening of the electric component, the hardenable material can establish a column-like or pin-like connection between, on the one hand, the subfloor and, on the other hand, a layer of the hardenable material covering the component.

The at least one recess is preferably slot-like or comprises one or more slots. In particular, on the electric component, slot structures, keyhole contours or other similar contours can be provided. The electrical capacitance which has an influence on the sensor-based detection of elements which lie on the flooring is advantageously particularly high in the electric components equipped according to the invention. By means of the at least one recess, the capacitance of the component changes positively. Capacitance is understood to mean in particular an electric capacitance whose variation can be detected by the evaluation device.

The electric component advantageously has a flat shape. For example, it is plate-like. The upper side and/or the lower side is(are) preferably planar surfaces or substantially planar.

It is preferable for the electric component to be planar in such a manner that its longitudinal dimension and/or transverse dimension, which advantageously extend horizontally or substantially horizontally when the component is in the mounted position, is greater by a factor than a height dimension of the component, which extends between its lower side and its upper side. The factor is, for example, at least 5, preferably at least 10, more preferably at least 20.

A height of the component, that is to say the distance between its upper side and its lower side, is preferably less than 1 cm, in particular less than 7 mm, more preferably less than 5 mm.

Preferably the electric component has a maximum dimension in length and/or width of approximately 20-30 cm. For example, the component element can have a dimension of approximately 20 cm in width and 30 cm in length. DIN A4, for example, has such a measurement. However, smaller or larger electric components are also possible, for example, equivalent to DIN A5 or equivalent to DIN A3, i.e., for example, electric components having measurements of approximately 15×30 cm to approximately 30×40 cm.

The at least one electric component advantageously has a base leg and at least one lateral leg protruding from the base leg. Between the base leg and the lateral leg, at least one recess is located.

The electric components with legs forming an angle with respect to one another can be produced efficiently from a base material. For example, the base material can be cut so that the base material as it were remaining in the production of a recess of one component can form a section, in particular a leg, of the other component. Thus, for example, E-shaped structures can be produced from a plate-like support with little waste, when the legs protruding from an E-shaped component as it were form the recesses of the other E-shaped component.

It is preferable for the electric component to comprise a base leg and at least two lateral legs protruding from the base leg. The lateral legs can be arranged on the same side of the base leg or on mutually opposite sides of the base leg. In the latter case, a Z-shaped component is implemented, for example.

The at least one lateral leg and the base leg advantageously form a comb-like structure or contour. The at least one lateral leg protrudes, for example, at a tight angle or at an angle between 80 and 110° from the base leg. However, it is also possible for the lateral leg to protrude at a flatter or steeper angle from the base leg, for example an angle of 120-140° or the like.

For example, the electrical component can be in the shape of an L, a T, an E or a U, in particular viewed from the upper side or the lower side of the component.

A preferred design provides that the flooring comprises at least one electric component, in particular an electric component of identical contour compared to the at least one electric component, which engages at least partially in the recess of the at least one electric component. Thus, for example, the above-mentioned U-shaped components can be arranged so that they intermesh or engage in one another. For example, the lateral leg of one component engages in a gap between the base leg and a lateral leg or in a gap between lateral legs of the other component. Here, it is preferable if the components do not overlap, i.e., it is preferable that one component engages in the recess of the other component freely and without electric contact. A gap between the mutually engaging portions of the components is advantageously filled with the hardenable material.

It is preferable for at least one electric component to form a part of an arrangement of multiple electric components. Advantageously, the components are of identical contour or identical design or both. Moreover, it is advantageous if the arrangement provides a grid, i.e., that, for example, the electric components are arranged in adjacently arranged quadrants. The electric components can also be in a matrix-like arrangement.

It is preferable if the electric components are arranged with mutual spacing and/or do not overlap. In this way, the electric components can provide, for example, capacitor surfaces which are separate from one another and electrically separated from one another. The capacitor surfaces are not electrically connected to one another.

It is preferable if the electric components are arranged in a row arrangement. For example, it is advantageous if electrical components of identical design or identical contour are arranged in each row of the row arrangement. The rows advantageously extend along straight lines. The rows of the electric components are advantageously parallel to one another.

Advantageously, in an electric component, it is provided that it comprises a plate-like support. For example, the support can be formed by an electric circuit board or printed circuit board. The plate-like support forms a stiffener for the electric component. The plate-like support can advantageously contribute to embedding an electric component arranged on the support, in particular an electrical conductor surface and/or capacitor surface, in a predetermined alignment and/or a flat position in the flooring. In particular when the subfloor is uneven or rough, the support as it were forms a reference plane, for example, for an electric capacitor surface or another electric function of the electric component.

The plate-like support can be rigid or resilient. The resilient support can be adapted, for example, to a contour of the subfloor.

The electric component can also comprise a deformable and/or resilient support. Thus, for example, an electrical conductor surface, in particular a capacitor surface, can be arranged on the resilient or deformable support. Thus, the support can be, for example, a fabric layer, a film or the like.

For the at least one electrical conductor surface, copper is particularly suitable. However, an aluminum layer can also be used readily. Therefore, the electrical conductor surface is produced from an electrically conductive material or a material that absorbs electrical charges. The electrical conductor surface or conductor surface is advantageously a capacitor surface or designed for the formation of a capacitor or a capacitive sensor.

A support for the electric component or of the electric component is advantageously electrically insulating. The support of the electric component advantageously consists of an electrically insulating material, for example, a typical circuit board material, or it comprises such an insulating material. For example, the support consists of an electrically insulating plastic material or comprises such a material. However, the support can also be, for example, a support film, in particular a plastic film or a film made from another insulating material.

It is advantageous if the at least one electric component comprises at least one electrical conductor surface, in particular a conductor surface extending in a plane parallel to the upper side or lower side. The conductor surface is arranged, for example, on the plate-like support. The electrical conductor surface extends advantageously substantially over the entire planar extension of the electric component transversely to the sides of the component which extend between the upper side and the lower side of the component.

Furthermore, it is advantageous if the electric component comprises a first electrical conductor surface and a second electrical conductor surface. The first electric surface is advantageously arranged on the upper side or in the region of the upper side of the component; the second electric surface is advantageously arranged on the lower side. The second electrical conductor surface advantageously forms a shielding. The second conductor surface or shielding and the first conductor surface preferably have the same planar extension.

For example, the second electrical conductor surface extends on the lower side opposite the subfloor. The second electrical conductor surface is advantageously without interruption. The first electrical conductor surface can comprise a first conductor surface section and a second conductor surface section, which are electrically separated from one another. For example, the conductor surface sections can provide mutually separate capacitor surfaces. The first and the second electrical conductor surfaces are arranged, for example, on an upper side and a lower side of the support which is in particular plate-like.

It is preferable if the first conductor surface and/or the second conductor surface extend(s) substantially over the entire surface extending parallel or substantially parallel to the subfloor. It is possible that the first and/or the second conductor surface comprise(s) interruptions and/or that an outer marginal region of the electric component is not covered by the first and/or second conductor surface.

A preferred design is one in which at least one electrical conductor surface is entirely or substantially covered by a protective lacquer or a protective coating. For example, it is advantageous if the conductor surface is arranged with protection sandwiched between the plate-like support and the protective lacquer or the protective coating. It would be readily possible for conductor surfaces arranged on mutually opposite sides of the plate-like support be covered in each case by a protective lacquer or a protective coating. The protective lacquer or the protective coating is sprayed on, for example. In the region of an electric contacting for an electric connection line h leads to the electric component, the protective lacquer or the protective coating can comprise a recess.

The protective lacquer or the protective coating is advantageously an electrically insulating protective lacquer. The protective lacquer can also provide mechanical protection for the electrical conductor surface.

It is preferable if the protective lacquer represents a layer separate from the adhesion promoter. However, it is also possible that the protective lacquer at the same time represents the adhesion protector, and/or an adhesion protector or an adhesive is embedded in the protective lacquer. Thus, for example, a granulate can be arranged by means of the protective lacquer on the electric component, wherein the granulate provides a mechanical hold on the hardenable material, when it is hardened.

It is preferable if the at least one electric component is connected by means of a connection line to an evaluation device. The connection line advantageously comprises a shielded line, a coaxial cable or a coaxial line.

Thus, the connection line comprises, for example, at least one signal line which is shielded or runs in a shielding. The shielding is an electric shielding. Between the shielding and the at least one signal line, an electrical insulation layer or an electrical insulator is provided. The shielding is, for example, an electric conductor or an electrically conductive layer. The shielding comprises, for example, a mesh of wires or other electrical conductors, a film or the like. Within the shielding, the at least one signal line or an arrangement of multiple signal lines runs. The signal line is used, for example, to detect an electric capacitance or capacitance variation of the electric component. The shielding prevents electric interferences, for example, by electric fields, with the at least one signal line of the connection line. The shielding can be connected at both longitudinal ends or at only one longitudinal end of the connection line to an additional electric conductor, for example, the evaluation device, the electric component, a grounding or the like. It is preferable if the shielding of the connection line is connected to a shielding, for example, the above-mentioned second conductor surface, of the electric component.

The evaluation device can form a part of the flooring or an arrangement which comprises the flooring. However, the evaluation device can also be an evaluation device to be connected subsequently to the flooring or the at least one connection line, evaluation device which does not form a part of the flooring or of the arrangement comprising the flooring.

The following measure represents a separate invention or an advantageous design of the embodiments of the invention explained so far or still to be explained, for example, in connection with the preamble features of claim 1 or the features mentioned at the start, in which it is provided that the electric component is designed as a capacitive sensor or capacitor and that the flooring comprises an evaluation device, in particular the already explained evaluation device, or forms a part of a system comprising such an evaluation device. In this design, the evaluation device is designed to output a message signal depending on a change in the capacitance of the electric component by a predetermined or adjustable capacitance value within a predetermined, for example, parametrized or predetermined by electric components such as a resistor, for example, or adjustable detection time span. For example, the evaluation device compares a change of the capacitance value within a predetermined time span with a comparison value which is predetermined or can be adjusted. The evaluation device thus verifies, for example, a first time derivative of the respective determined capacitance value.

When the evaluation device determines the capacitance of the electric component in identical cycles, for example, 10-30 measurements per second, a comparison of the respective capacitance value with a previous capacitance value is sufficient to determine the increase of the capacitance by a predetermined amount. In this case, the evaluation device can determine the difference of the capacitance values of successive, in particular immediately successive measurements and compare them with the adjustable or adjusted capacitance value, in order to generate a message signal as a function thereof.

Therefore, the evaluation device thus detects the capacitance of the electric component, for example, by means of a microprocessor. Here, for example, the above-mentioned conductor surfaces representing a capacitor can be provided on a support. The connection between the component and the capacitive sensor or capacitor, namely the electric component, here occurs in particular by means of a shielded line, for example, a coaxial line. The evaluation device determines the capacitance value of the electric component, for example, by means of an oscillation circuit, the frequency of which is measured. Furthermore, via a known impedance, a charging or discharging curve can be measured with respect to time. However, a bridge circuit, for example, a Wheatstone bridge, can also be provided in the evaluation device for determining a capacitance value. In an embodiment example, the capacitance is determined by means of the curve of a change in voltage at the output of the evaluation device.

It is preferable if the evaluation device is designed for filtering out drift of the capacitance of the electric component over a time span which is longer than the detection time span. For example, this occurs in that the evaluation device notes the slowly increasing capacitance and outputs a message or generates the message signal only when the capacitance value has changed by a predetermined or adjustable capacitance value within the predetermined or adjustable detection time span by a predetermined or adjustable amount, that is to say by a corresponding capacitance value. The detection time span is, for example, 5 to 10 times, preferably up to 100 times shorter than the time span used as basis for the drift. Thus, for example, when the humidity of the air or other similar influences change the capacitance of the component over a prolonged time, this plays no role in the triggering of the message signal or the detection by the evaluation device. It is only when the capacitance value of the capacitive sensor changes by a predetermined larger amount within a shorter time that the evaluation device triggers the message signal. For example, when a human or another body enters the detection region of the capacitive electric component, a rapid change in capacitance is observed by the evaluation device, which prompts the evaluation device to generate the message signal.

It should be mentioned here that it is advantageous if the evaluation device comprises an evaluation logic which, for example on the basis of the change of multiple capacitance values of adjacent electric components or capacitive sensors or capacitors, determines that a change to be reported is in fact present on the surface of the flooring, for example, because a human has fallen on the floor. Thus, for example, when only a single electric component exhibits a change in capacitance to a significant extent, this is filtered out by the evaluation device, because a human does not have an effect on the capacitance of just one electric component.

Preferably, it is provided that a microcontroller of an evaluation device for the flooring according to the invention preferably comprises a plurality of inputs and outputs, for example, at least 15-30, preferably 40 inputs and/or outputs. To increase the number of inputs and outputs for the connection of electric components, the evaluation device can also comprise a multiplexer which is arranged between a connection arrangement, comprising inputs and/or outputs, of the evaluation device for the connection of electric components of the flooring, and a connection arrangement, comprising inputs and/or outputs, of the microcontroller.

An evaluation device of the flooring or of the system which comprises the flooring according to the invention advantageously comprises at least one bus interface, for example, a USB interface, and/or a bus coupler and/or a network interface or the like. The respective interface can be wireless or wired. Therefore, the evaluation device thus has at least one wireless and/or at least one wired interface. An Internet interface, a wireless LAN, a Bluetooth interface or the like are also advantageous in the evaluation device.

The evaluation device can be provided redundantly for safety reasons.

It is preferable if the capacitive sensor or capacitor is connected via a shielded line to the evaluation device, so that said evaluation device can reliably detect the capacitance values.

An advantageous design provides that the electric component is connected by means of a shielded line, for example, a coaxial line, to the evaluation device.

For example, the shielding of the respective shielded line and of the shielded conductor of the respective line are advantageously connected to the electric component and/or the evaluation device.

It is possible that the shielding of the respective shielded line is connected only to the electric component or only evaluation device or to both. The data- or information-transmitting conductor connects the electric component to the evaluation device. It is preferable if the shielding of the shielded line is connected exclusively to a shielding of the electric component or to a grounding of the electric component, which is connected to the longitudinal end of the shielding of the shielded line, which is associated with the evaluation device, but not to the evaluation device, that is to say which remains open or is connected to the grounding.

For example, it is advantageous if a central conductor or a so-called core of the coaxial line or the shielded conductor of the shielded line is connected to an electrical conductor surface of the at least one electric component, which is used as a capacitor. A shielding extending around the central and/or shielded conductor, for example, a mesh, of the coaxial line is advantageously connected to an electrical conductor surface used as a shielding for the component. Thus, for example, the electrical conductor surface on the lower side or facing the subfloor, the shielding, of the component can be connected to the shielding of the coaxial line.

It is advantageous if each electric component is connected to the evaluation device by an individually shielded line, in particular a coaxial line. It is possible that multiple lines shielded in this manner are gathered to form a cable bundle or a cable.

The shielded line or coaxial line is advantageously provided with an electric insulation layer, for example, a sheath. The shielded line or coaxial line or the connection line is advantageously embedded in the hardenable material.

An advantageous design or a separate invention is represented if it is provided that the flooring comprises multiple electric components, in particular multiple electric components of identical design or contour, which are or can be connected to an evaluation device by mutually separate connection lines. Thus, the evaluation device can separately control each component and/or individually communicate with each component, for example, it can receive messages, signals and the like from the component. The connection lines advantageously run at least in sections in the flooring. For example, connection sections of the connection lines are led out of the flooring and/or arranged in its marginal region. In the marginal region, the evaluation device is or can be arranged.

The mutually separate connection lines are preferably arranged separately or individually in the flooring. However, the mutually separate connection lines can also be led at least in sections in a common bundle, for example, in a cable, an empty tube or the like. Preferably each separate connection line is provided with a shielding, so that it is shielded from the other connection lines and/or from other electric components.

It is advantageous if all the capacitively and/or inductively detecting electric components of the flooring are each provided with an individual connection line which is separate from all the other connection lines and runs at least in sections in the flooring. The individual connection lines comprise connection regions which are or can be connected to the evaluation device.

It is preferable if the separate connection lines run at least in sections in the flooring, for example, in the hardenable material. The separate connection lines are preferably shielded connection lines. The separate connection lines advantageously comprise one or more signal conductors connected to the respective component and provided with a shielding. The shielding is preferably connected to the respective component and/or can be or is connected to the evaluation device.

However, alternatively or additionally, a configuration or arrangement with at least one bus line is also possible, to which at least two electric components are connected. Via the digital bus line, the components and the evaluation device can communicate with one another.

It is possible that a first arrangement of electric components with, for example, electronic components, RFID elements or the like, is or can be connected by means of at least one bus line to an evaluation device, and a second arrangement of electric components, in particular of capacitive sensors, is connected in each case by means of separate, in particular shielded, connection lines to the above-mentioned evaluation device or to another evaluation device.

The electric evaluation unit is used, for example, to evaluate an electric capacitance of the component. The electric capacitance changes when the component is changed, for example, by a body, in particular a person, in the region of the electric component. Thus, the flooring can form in a manner of speaking an intelligent flooring comprising several evaluation zones.

It is advantageous if the adhesion promoter has a granular structure. For example, the basic structure can be provided by a granulate or particles. The granulate or the particles can be contained in a lacquer or another surface coating arranged on the surface of the component.

However, the adhesion promoter can also comprise a coating which is capable of binding to the hardenable material.

A method according to the invention for producing a flooring as a covering for a subfloor, wherein the flooring comprises a layer made from a hardenable material when the flooring is in the finished state and in which at least one electric component is embedded, in which at least one electric component is embedded, wherein the electric component has a lower side facing the subfloor in the mounted position and an upper side lying opposite the lower side, provides for the use of an electric component according to the invention.

For manufacturing the electric component, the following procedure is advantageous:

A method for producing a flooring as a covering for a subfloor, wherein the flooring comprises a layer made from a hardenable material when the flooring is in the finished state and in which a reinforcement fabric and at least one electric component are embedded, with the steps:

gluing the at least one electric component by means of its lower side to a subfloor, in particular to an unfinished floor, covering the at least one electric component on its upper side facing away from the substrate with a reinforcement fabric, and introducing the hardenable material into the reinforcement fabric in such a manner that the hardenable material encloses the electric component, and the at least one electric component is covered on the upper side by the reinforcement fabric and the hardenable material.

Advantageously it is provided that the at least one electric component is connected by means of its lower side to a subfloor, in particular an unfinished floor, by gluing, and the reinforcement fabric covers the at least one electric component by means of its side facing away from the subfloor, so that the at least one electric component is covered on the upper side by the reinforcement fabric and the hardenable material. It is advantageous if the reinforcement fabric flatly covers multiple electric components arranged next to one another. Advantageously, the reinforcement fabric is laid in webs over multiple electric components. The webs can be arranged or run next to one another and/or in an overlapping manner.

Under the electric component, an adhesive layer is located. The adhesive layer can be a continuous adhesive layer extending over the entire subfloor or larger surface areas, or it can also be an adhesive layer provided in each case only directly under the respective electric component. Thus, it is possible that the adhesive layer covers a larger surface than the electric component or the electric components.

Moreover, it is possible that the adhesive layer glues only subregions of the electric component to the subfloor, for example, one or more adhesive points can be present. Therefore, the electric component thus does not have to be glued over the entire surface to the subfloor, but instead it can also be glued only on a subsection or multiple subsections of its lower side to the subfloor. For example, it is possible that the electric component is glued only in a marginal region to the subfloor.

It is also possible that the electric component is glued indirectly to the subfloor, namely in that it is fastened on a support material, for example, on a lining, which in turn is glued to the subfloor.

In an advantageous approach, the at least one electric component, for example, an electronic component, and/or an electric connection line for the component is/are connected by gluing to the substrate, so that the respective electric components or the connection line does not rise or float from the substrate when the hardenable material is applied. Between the at least one electric component or the connection line and the substrate, a bonding course is present.

The respective electric component is thus reliably fastened at the predetermined site, so that it can optimally perform its electrical function. Localization functions, sensor functions or the like can be implemented optimally in that, for example, grid spacings between the electric components are reliably maintained.

The at least one electric component and a connection line optionally leading to the component thus remain in position when the hardenable material is applied, which then additionally ensures a firm hold of the at least one electric component or the connection line with respect to the substrate. In an additional work step, the hardenable material and the reinforcement fabric are arranged above the at least one electronic component or the at least one connection line, so that the reinforcement fabric protects these components from mechanical influence, in particular during a manipulation of the hardenable material and/or during the use of the flooring.

The reinforcement fabric, by means of the hardenable material which comprises, for example, a synthetic resin, for example, epoxy resin, polyurethane resin or the like, forms an integrated upper compound seal of the flooring which entails several advantages. For example, moisture-exposed areas of a building, for example, kitchens, sanitary installations or the like, can be equipped with the flooring.

The reinforcement fabric advantageously covers the electric component on its upper side with at least one fiber, preferably a fiber arrangement with multiple fibers or interwoven fibers.

The flooring can thus provide, for example, an upper-side sealing, in particular also a sealing against moisture, of the subfloor, as well of the as electric components sandwiched between subfloor and reinforcement fabric, for example, RFID tags. Thus, the flooring has been enhanced so to speak functionally by the electric components is suitable, for example, for use in an industrial environment, in commercial kitchens, in the clinical sector or the like.

The flooring can be covered on the upper side, for example, with tiles or in particular with continuous seamless coverings, made likewise from a synthetic resin material, for example. Here, not only the upper layer but also the hardenable material together with the reinforcement fabric form a moisture barrier The flooring also improves the so-called adhesive tensile strength and/or ensures optimal crack bridging. For example, when the subfloor, for example, the unfinished floor, has cracks, joints or the like, the flooring according to the invention forms a stable bridge over them.

The reinforcement fabric above the at least one electric component ensures optimal protection. Thus, pressure application from above has no effect or in any case only a small effect on the electric component, so that the component is not affected or affected only to a small extent.

The flooring forms a stable base for additional coverings or covering layers, for example, a carpet, tiles, a parquet flooring or an elastic covering or the like.

The flooring is nearly monolithic and/or all of a piece, i.e., less elastic coverings can also be arranged over the flooring, for example, synthetic resin coverings, tiles or the like.

The flooring according to the invention is advantageously jointless and/or continuous between peripheral walls or side walls of a building, that is to say without interruption.

Advantageously, on the flooring according to the invention, jointless upper coverings or upper coverings which are continuous between side walls or peripheral walls of a building, for example, PVC, linoleum, synthetic resin coverings or the like, can be arranged. The flooring is a stable support for this.

The at least one electric component can be, for example, at least one electronic component, in particular a semiconductor element, a sensor, a localization element or the like. Advantageously, the at least one electric component is designed as a capacitively detecting element or capacitor element, in particular as an anode or cathode of a capacitor and/or it comprises a capacitor surface.

The at least one electric component is provided and/or designed, for example, for the detection by sensor of at least one physical parameter, in particular a magnetic field and/or an electric field or a pressure. In particular, the at least one electric component is preferably provided and/or designed to physically detect a person or an object located on the flooring.

The at least one electric component can also comprise or form an electronic component. The electronic components are or comprise, for example, at least one radio identification data carrier or so-called localization elements, in particular radio tags or RFID tags. Furthermore, the electronic components can also comprise sensor elements, i.e., for example, load sensors, capacitive sensors, inductive sensors, acceleration sensors or the like.

Using the at least one electric component, in particular an arrangement of multiple electric components, a localization of an object or of a person on the flooring is possible, for example.

By means of the at least one electric and/or electronic component, a vehicle, in particular a self-driving vehicle or a robot, can determine its position. The vehicle is, for example, a cleaning robot, a warehouse vehicle, a transport robot or the like. For example, the electronic components transmit localization information to the vehicle, so that said vehicle can navigate on the flooring. For example, by means of the electronic components, vehicles can be autonomously mobile or navigate independently on the flooring.

By means of the at least one electric component or the arrangement of multiple electric components, in particular in a function as capacitive detection elements, the position of the respective vehicle can be actively detected, i.e., independently of the functionality of the vehicles, the sensor arrangement or evaluation device can detect the position of the vehicle, for example, at the margin of the flooring.

The functions of the sensor system advantageously also comprise safety functions. For example, a person who is moving independently of the vehicle or the vehicles on the flooring can be located. The sensor arrangement can detect, for example, whether a person is standing, that is to say moving uninjured, or lying on the floor. Thus, a high safety level can be implemented, for example, in that, when a person is lying on the floor or when there is an imminent collision with a vehicle, the respective vehicle or vehicles or other automation systems and devices in the region of the flooring according to the invention can be automatically stopped.

The electronic component is or comprises, for example, a semiconductor chip, in particular an RFID chip. The electronic component can also be a sensor, in particular a load sensor, a force sensor or the like. For example, it is possible that several different electronic components, for example, sensor elements and RFID chips, are provided.

For the gluing, a so-called synthetic resin undercoat, for example, an epoxy resin undercoat, a polyurethane resin undercoat, an acrylic acid undercoat or the like can be used.

The hardenable material and/or an adhesive or an adhesive layer for gluing the electric component to the subfloor advantageously has sufficient elasticity for bridging cracks with crack widths of at least 0.5-1 mm, preferably of more than 1 mm.

A connection line for the at least one electric component comprises, for example, an electric conductor strip which is fixed on the subfloor by means of gluing.

In principle, electrically conductive metal strips, in particular aluminum strips and/or copper strips are suitable as connection lines. Metal strips have a flat shape and are strip-like. But electric cables, that is to say electric conductors, which have a flat shape, can also be used successfully in practice as connection lines, in particular coaxial lines. However, it should be noted that a coaxial line certainly can also have a flat shape, that is to say, for example, a flat rectangular or flat oval cross section.

An advantageous method for fastening the at least one electric component on the subfloor provides, for example, that said component is arranged on a lining material, wherein the fining material with the electric component arranged thereon is glued to the subfloor or unfinished floor. The lining material is so to speak the support for the at least one electric component, in order to attach said electric component advantageously to the substrate of the subfloor or unfinished floor.

It is possible that a surface extent, for example, a width, of the lining material is greater than a surface extent or width of the at least one electric component, so that the lining material protrudes on at least one side from the electric component, which facilitates the attachment to the substrate.

It is obviously possible that, on the lining material, multiple electric components, for example, are arranged with respect to one another at identical distances in longitudinal direction or transverse direction or both. For example, the lining material can have a strip-like design, for example, it can form a strip, and the electric components can be arranged one after the other in a row direction on the lining material. However, it is also possible that the electric components are in a matrix-like arrangement or arranged next to one another in a grid pattern on the lining material.

The lining material is advantageously a flexible and/or resilient support for the at least one electric component or an arrangement of multiple electric components. The lining material can cover the surface of the at least one electric component and/or have perforations. For example, the lining material is a fabric, a film or the like.

Advantageously, the strip material or lining material is relatively small, so that it is easy to handle. A strip material or lining material width of approximately 5-15 cm, advantageously approximately 8-12 cm is preferable. In practice, laying such a lining material on the subfloor has been found to be particularly advantageous.

By means of the lining material, the equidistant arrangement of electric components or in any case the arrangement of components at predefined, possibly different, spacings on the subfloor is considerably facilitated. The components are arranged at the desired spacings on the lining material, which is only then laid out in addition on the subfloor or glued thereto. The lining material can be rolled up, for example, and already contain the electric components. The lining material is then rolled out, for example, on the subfloor and here advantageously glued at the same time.

An advantageous design of the invention provides that the lining material comprises a fabric or is formed by a fabric. It is possible that the lining material consists of the same material as the reinforcement fabric.

Preferably it is provided that a mechanical load bearing capacity of the lining material is clearly lower than that of the reinforcement fabric. In fact, the reinforcement fabric has a protective function for the at least one electric component, while the lining material as it were represents an aid for attachment to the substrate.

The lining material is preferably a material which is permeable to the adhesive layer. For example, a fabric, a nonwoven or the like can advantageously be used.

Advantageously, the lining material is chemically resistant to the adhesive material for the adhesive layer for the subfloor and consequently it is etched little or only insignificantly by the adhesive material.

Moreover, it is advantageous if the lining material is not thinned and/or decomposed by the adhesive material. Thus, for example, a paper nonwoven can be decomposed or thinned by the adhesive material. Here it is advantageous for the lining material to consist or at least comprise a plastic material and/or a textile material and/or glass fibers.

Advantageously, the lining material is very thin, so that it has little or no effect on the height of the subfloor. A height of the lining material of between 0.5 and 2 mm, particularly preferably of approximately 1 mm is advantageous.

The lining material is advantageously flexible or resilient, so that it can be rolled up together with the electric components arranged thereon. Thus, it can be rolled up in a roll, for example, which can be easily rolled out on the subfloor.

The at least one electric component advantageously comprises an adhesive layer for attachment on the reinforcement layer or the subfloor. For example, on a lower side and an upper side of the electric component, adhesive layers can be present, so that it can be glued, on the one hand, to the subfloor and, on the other hand, to the reinforcement fabric. The adhesive layers can be covered by a protective film or protective layer which is removed before the attachment on the subfloor or before the attachment of the reinforcement fabric. However, it is also readily possible that the component comprises only one adhesive layer, for example, on its upper side for the reinforcement fabric or on its lower side for the subfloor.

Advantageously, the electric component, in particular the electronic component, is arranged in a protective capsule. For example, a protective housing is advantageous for an electronic semiconductor component, a chip or the like.

The unfinished floor or subfloor as a rule has sharp edges or is uneven. This can lead to damage to electric components, for example, chips or other semiconductors. Therefore, it is advantageously provided that the at least one electric component is provided with a protective layer or a protective capsule.

It is advantageous if the at least one electric component is covered on at least one side, preferably on multiple sides or on all the sides, with a foam material, in particular a layer of foam material. The foam material can be, for example, a mineral foam. A plastic foam is particularly preferable. In practice, polyurethane has proven itself as foam material. Alternatively to the foam material or in addition thereto, a sheathing material made of an elastic substance is also possible, for example, an elastic plastic, rubber or the like.

The at least one electric component can comprise a protective layer, for example, a foam layer or another elastic layer on its upper side or its lower side or on both sides. Advantageously, an elastic or soft protective layer is provided, which as it were compensates for any irregularities, in particular sharp-edged protrusions of the subfloor.

The foam material has the advantage that it undergoes a binding to the hardenable material, or the hardenable material can penetrate into the foam material, which represents a particularly firm hold of the at least one electric component in the hardenable material when it is hardened. Particularly preferable is a type of protective capsule consisting of foam material.

Moreover, the foam material or else the elastic material has the advantage of having a certain resilience, i.e., a loading which occurs in the direction of the electric component is resiliently absorbed by the foam material.

Moreover, it is conceivable that, in a flooring according to the invention, the electric component is arranged in a hard capsule. A combination of hard capsule and soft capsule, namely, for example, a hard plastic and a foam material, is also readily possible.

Preferably, the at least one electric component is provided with an electric shielding on its lower side facing the subfloor. This measure ensures, for example, the prevention or reduction of interfering influences caused, for example, by a metallic reinforcement of the subfloor (reinforced concrete, etc.). The electric shielding comprises, for example, an electrically conductive layer or an electrically conductive plate. The shielding can also be or comprise a shielding fabric. The electric shielding can be connected to the grounding. It is possible that the shielding is glued to the subfloor. Moreover, it is possible that the shielding forms a part of the electric component.

The at least one hardenable material and/or the adhesive provided for gluing the at least one electric component can comprise, for example, a synthetic resin material, in particular a synthetic resin, for example, epoxy resin, polyurethane resin, acrylic resin or the like, or a mixture of at least two synthetic resins, for example, epoxy resin, polyurethane resin, acrylic resin or the like.

The synthetic resin, for example, epoxy resin, polyurethane resin, acrylic resin or the like is, for example, a synthetic resin consisting of polymers, to which a hardener is added, so that it hardens to form a thermosetting plastic with high strength and chemical resistance. Depending on composition and temperature, the originally liquid or pasty mixture hardens, for example, within a few minutes to several hours or days.

The hardenable material can also comprise a dispersion adhesive material.

It is possible that the at least one hardenable material comprises a mineral material which is, for example, a cement-containing material, concrete or a plastic-modified spackling compound or the like. The material of the adhesive for the at least one electric component for gluing to the subfloor can also consist of or comprise such a material.

The hardenable material, for example, a synthetic resin material, for example, a synthetic resin, for example, epoxy resin, polyurethane resin, acrylic resin or the like, or a mixture of multiple synthetic resins, produces a bond to the subfloor, for example, to a screed or concrete or hollow floor system or a double floor system. In any case, the floor system can comprise subelements whose transition areas are covered by the flooring according to the invention. For example, a so-called hollow floor system or double floor system consists of floor elements which rest next to one another on supports or another similar substrate.

Here it should be noted that the hardenable material is in fact preferably homogeneous, that is to say, only a single hardenable material is used. However, a layered structure is also possible, i.e., for example, a mineral layer of the hardenable material directly on the subfloor.

The reinforcement fabric is, for example, a fabric with fibers made from polyethylene or polypropylene or polyester. Carbon fibers or glass fibers or natural fibers are readily possible as well. The reinforcement fabric advantageously comprises an electrically non-conductive fabric, so that it has no influence on the electric function of the at least one electric component.

The reinforcement fabric is advantageously a rolled material which can be handled or rolled out easily. In practice, a width of the reinforcement fabric of approximately 80-120 cm has been found to be advantageous and easy to handle. At this width, the reinforcement fabric, on the one hand, can still be conveniently rolled out, and, on the other hand, it is sufficiently broad to provide tensile strength and thus mechanical strength over larger surface areas.

An advantageous layer thickness of the hardenable material is preferably approximately 1 to 10 mm, in particular 5 to 8 mm. A layer thickness of, for example, 1 mm to 2 mm or 2 mm to 3 mm is also obviously advantageous.

A layer thickness or material thickness of the hardenable material is advantageously selected so that the at least one electric component or all the electric components are covered by the hardenable material. Advantageously it is provided that a layer of the hardenable material above the at least one electric component has a thickness of approximately 2-3 mm, in particular 4-5 mm.

The reinforcement fabric advantageously lies flat on the at least one electric component or electric components. Naturally, it is possible that slight height enlargements in the region of the electric components are present. Height enlargements result, for example, when, in addition to a chip, a protective encapsulation or protective housing is also provided, in which the chip is arranged.

An advantageous embodiment of the invention provides that the flooring comprises an elastic layer or an elastic covering above the hardenable material. The elastic layer is advantageously applied to the material after the hardening of the hardenable material.

The elastic covering can form, for example, a damping for footfall sound. From ergonomic standpoints, for example, of protection of the musculature and/or joints of the user of the flooring, the elastic covering is advantageous. The room acoustics can also be improved by the flooring of the elastic layer.

Thus, the flooring is, on the one hand well-equipped functionally due to the electric component or the electric components for navigation purposes or sensor purposes, for example, and, on the other hand, well-equipped ergonomically, namely in that the elastic layer or the elastic covering flexibly dampens, for example, footsteps. Moreover, the elastic covering or the elastic layer also has advantages to the effect that the pressure loads do not impact the electric component(s) are absorbed.

Here, it should be noted that naturally the full functionality, namely navigation, sensor function and ergonomics can be combined, that is to say, for example, localization elements, sensor system elements, for example the electric components used as capacitor surfaces or capacitive surfaces, and the ergonomically advantageous elastic covering are present.

On the elastic covering and/or the hardenable material, a hard layer or top layer can be arranged. The hard layer so to speak floats on the elastic covering. The hard layer is harder than the elastic covering. For example, the hard layer consists of a synthetic resin material, in particular, a synthetic resin, for example, epoxy resin, polyurethane resin, acrylic resin or the like. It is any case possible for a jointless layer or a jointless covering to be arranged above the elastic covering.

Preferably, it is provided that above the elastic covering, a hard covering, made of polyurethane resin, for example, is arranged, the modulus of elasticity of which is equal to or approximately equal to that of the elastic covering.

A rubber granulate, for example, is suitable as elastic layer or elastic covering. The granulate can so to speak be scattered and subsequently bound with a binder or it can also be covered only by another additional covering arranged above the elastic layer. But a sheet material is preferable, for example, a rubber granulate in the form of a sheet or rolled material.

A particularly preferred layer thickness of the elastic layer is approximately 2-5 mm, for example. However, the layer thickness can also be slightly larger or thicker, for example, 6-8 mm.

An advantageous embodiment of the invention provides that the subfloor or unfinished floor is pretreated, for example, by polishing and/or shot blasting or other abrasive work methods, so that it is optimally prepared for gluing the at least one electric component. It is preferable if the subfloor or unfinished floor is evenly flat. An advantageous measure provides that, before the attachment of the flooring according to the invention, the subfloor or unfinished floor is leveled or preprocessed until it is flat.

Advantageously, it is provided that the subfloor or unfinished floor has absorbency either by nature or due to the above-mentioned processing, so that it enables a binding to the adhesive layer and thus the electric components and/or a binding to the hardenable material.

Advantageously, it is provided that, after the abrasive preliminary treatment, the unfinished floor or subfloor is cleaned for example, vacuumed or washed. The goal here is to create as dust-free as possible a surface for the attachment of the at least one electric component and later the hardenable material.

The electronic components or electric components are advantageously glued by means of a hardenable adhesive or adhesive material to the subfloor or unfinished floor. The adhesive or adhesive material is preferably the same hardenable material in which the electric component or the electric components are later embedded. The adhesive thickness of this adhesive layer is smaller than the design height of the electric component or of the electric components. Therefore, the electric component(s) protrude(s) upward from the adhesive layer. Subsequently, the reinforcement fabric above the electric component or the electric components is attached, and finally the hardenable material is introduced. It is also possible the hardenable material is attached to the components glued to the subfloor or unfinished floor, and then the reinforcement fabric is attached.

The electric components are or the electric component is thus glued, for example, by means of a synthetic resin bonding course or polyurethane adhesive to the subfloor, before the reinforcement fabric and then a hardenable material are attached, or before first the hardenable material and then the reinforcement fabric are attached.

These work processes advantageously run so rapidly and efficiently that the adhesive is not yet completely hardened during the application of the hardenable material, in particular it has not yet formed a skin on its upper side, or it has only formed a skin which can be partially dissolved again by the hardenable material which is, for example, applied before the reinforcement fabric and/or introduced through the reinforcement fabric.

Advantageously, the work is carried out wet-on-wet so to speak, i.e., the adhesive material is not yet cured and is still capable of binding when the hardenable material is applied or introduced, that is to say when the second bonding course is applied. The second bonding course binds to the first bonding course, the adhesive layer, by means of which the at least one electric component is glued to the subfloor or the substrate.

For example, it is possible that first the hardenable material is applied to the at least one electric component and subsequently the reinforcement fabric is pressed into the hardenable material which is still capable of binding or soft. Conversely, it is also conceivable that first the reinforcement fabric is laid out so that the at least one electric component or the arrangement of multiple electric components is reliably covered, before the hardenable material is applied.

A preferred method provides that the reinforcement fabric is by troweling, i.e., using a trowel, into the hardenable material. It is also possible that the reinforcement material lying already on the at least one electric component is provided with the hardenable material from above, i.e., that the hardenable material is introduced through the reinforcement fabric with a trowel or another processing tool into the gaps of the reinforcement fabric and the gaps between the electric components.

It is preferable if the adhesive for gluing the at least one electric component to the subfloor and/or the hardenable material has or have a predetermined elasticity even after the hardening, so that, for example, cracks of the subfloor can be bridged. Advantageously, the hardenable material and/or the adhesive has or have an modulus of elasticity or E modulus of 100 to 3000 N/mm2, in particular 100 to 300 N/mm2 or 50 to 500 N/mm2. The hardenable material and/or the adhesive can also have an modulus of elasticity of, for example, 2000 to 5000 N/mm2, in particular 3000 to 4500 N/mm2. Advantageously, the hardenable material and/or the adhesive has or have an modulus of elasticity or E modulus of 1500 to 2500 N/mm2.

A tensile strength of the hardenable material and/or of the adhesive is preferably 80 to 120 N/mm2.

It is preferable if the elasticity of adhesive and/or of the hardenable material is sufficient to bridge a crack width of 0.5-1.5 mm, in particular of more than 1 mm.

Flexibilized and/or crystallization-inhibited construction chemicals, in particular epoxy resins, are advantageous as adhesive and/or as the hardenable material.

It is particularly preferable if the at least one electric structural element is embedded elastically or flexibly floating so to speak in the adhesive and the hardenable material. Preferably, the embedding of the electric component in the layer of the hardenable material and/or in the adhesive is flexible so that, for example, forces bringing about cracking of the subfloor may possibly lead to a local shifting of the structural element but not to its destruction. For example, screeds are commonly applied to shrinking or floating layers, for example, for footstep damping, which leads to cracking of the screed and thus of the subfloor. Here, the appropriately flexible and elastic material of the adhesive and/or of the hardenable material provides a remedy, in that it bridges such cracks and at the same time prevents or in any case considerably reduces tensile stress or other mechanical stress on the electric component.

It is advantageous if an elasticity of the adhesive and/or of the hardenable material is greater than an elasticity of the hard layer arranged above the hardenable material directly or above the intermediate layer of the Mastic material.

A hard layer or top layer of the flooring, which is arranged above the hardenable material (in particular in the hardened state), preferably has a pressure resistance of at least 35 N/mm2, preferably at least 40 N/mm2, particularly preferably at least 45 N/mm2.

BRIEF DESCRIPTION OF THE DRAWINGS

Below, embodiment examples of the invention are explained in reference to the drawing, FIG. 10 shows a cross-sectional view through one of the components according to FIG. 9 as well as a connection line connected thereto, and FIG. 11 shows a variant of an electric component which has passage openings, FIG. 12 shows an additional variant of an electric component in meandering form, FIG. 13 shows an arrangement of multiple electric components according to FIG. 12, FIG. 14 shows an additional variant of an electric component in a Christmas-tree structure, FIG. 15 shows an arrangement of multiple electric components according to FIG. 14, FIG. 16 shows an additional variant of an electric component in serpentine form.

DETAILED DESCRIPTION

Figure 1:
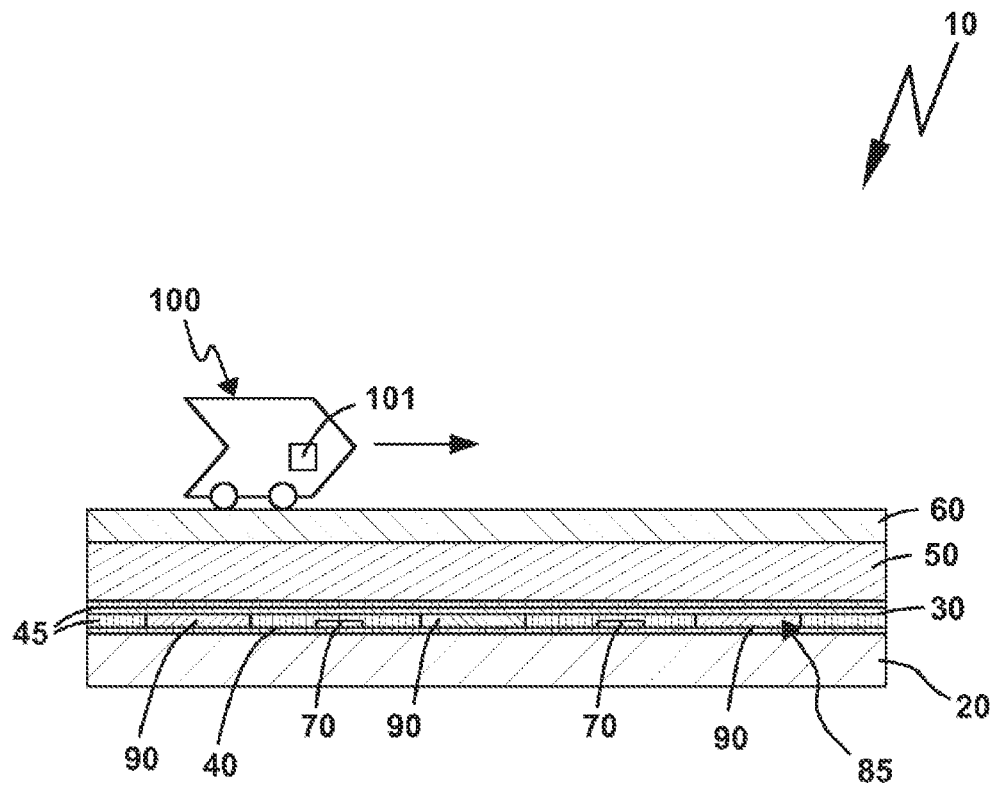
FIG. 1 shows a diagrammatic cross-sectional view of a flooring.

A flooring 10 according to the drawing has a layered structure which is constructed on a subfloor 20, for example, an unfinished floor. The unfinished floor can, for example, be a screed or concrete floor or a hollow floor system, in any case a load-bearing structure for the flooring 10. The subfloor 20 can also be a double floor system, for example. It is not necessarily important what the exact design of the unfinished floor or subfloor is, wherein the above-mentioned variants are preferable, or in any case a stable substrate.

Electric components 85 are glued on the subfloor 20 by means of an adhesive layer 40. In the case of the flooring 10, functionally different electric components are provided, which does not necessarily have to be the case but represents an advantageous option. Functionally equivalent electrical components are also possible.

For example, by means of the adhesive layer 40, localization elements 80 and sensor elements 81 are glued to the subfloor 20. The localization elements 80 and sensor elements 81 can be electric components 85.

The localization elements 80 are arranged, for example, on lining strips 41; the sensor elements 81 are arranged on lining strips 42. The lining strips 41, 42 are glued in a grid pattern to the subfloor 20. In each case, identical spacings are provided between the localization elements 80 on the lining strips 41 and the sensor elements 81 on the lining strips 42. The lining strips 41 are in each case parallel next to one another; likewise the lining strips 42 are also arranged parallel next to one another on the subfloor 20. For example, the lining strips 41, 42 run at a right angle with respect to one another, wherein other angular arrangements are also possible.

The localization elements 80 and the sensor elements 81 are connected to an evaluation device 72, for example, by means of electrical connection lines 71, of which only a single connection line 71 is represented diagrammatically.

Moreover, electric components 90 which are connected via connection lines 70 to an evaluation device 73 are embedded in the flooring 10. The components 90 are used for the capacitive detection of objects located on the flooring 10. It is possible that a connection line 70 is designed as a bus line. However, it is advantageous that, in contrast to the representation according to FIG. 3, a connection line 70 is provided for each of the electric components 90 in each case.

The evaluation devices 72, 73 can, for example, be arranged on the upper side of the flooring 10 or laterally next to the flooring 10. The evaluation devices 72, 73 detect objects and/or persons located on the flooring 10, thus, for example, a vehicle 100 or a person 140.

The electric components 90 have conductor surfaces, the respective capacitance of which is evaluated by the evaluation device 73 for detecting objects located on the flooring 10, for example, the person 140.

It is just an advantageous option that, as in the embodiment example of the drawing, the electric components are arranged in a flooring according to the invention in a grid on the subfloor. A chaotic arrangement of electric components on the subfloor, which is analyzed by a later measurement, for example, would also of course be possible.

The sensor elements 81 and the localization elements 80 are advantageously glued together in a grid pattern on the subfloor. The lining strips 41, 42, that is to say a lining material 43, facilitates the attachment of the lining strips to the subfloor 20 in the above-mentioned grid pattern.

The localization elements 80 are or comprise, for example, RFID tags 82 which can be read out by a corresponding reading device 101 of a vehicle 100. By means of the localization elements 80, the vehicle 100 can navigate on the flooring 10. For example, the localization element 80 in each case comprises a chip 87 and an antenna 86, which form parts of the RFD tags. The structure of such components is known. In any case, these components do not need an energy source, but are supplied with corresponding energy during the reading out by the reading device 101, namely via the antennas 86.

The sensor elements 81 are, for example, pressure sensors, load sensors or the like, which can detect a load on the flooring 10 and thus a presence of, for example, the vehicle 100 or the person 114. Naturally, other sensor functions, for example, electric fields, inductive influences or the like can also be detected by sensor means using sensor elements of the type of the sensor elements 81. The sensor elements 81 represent an advantageous option.

Figure 2:
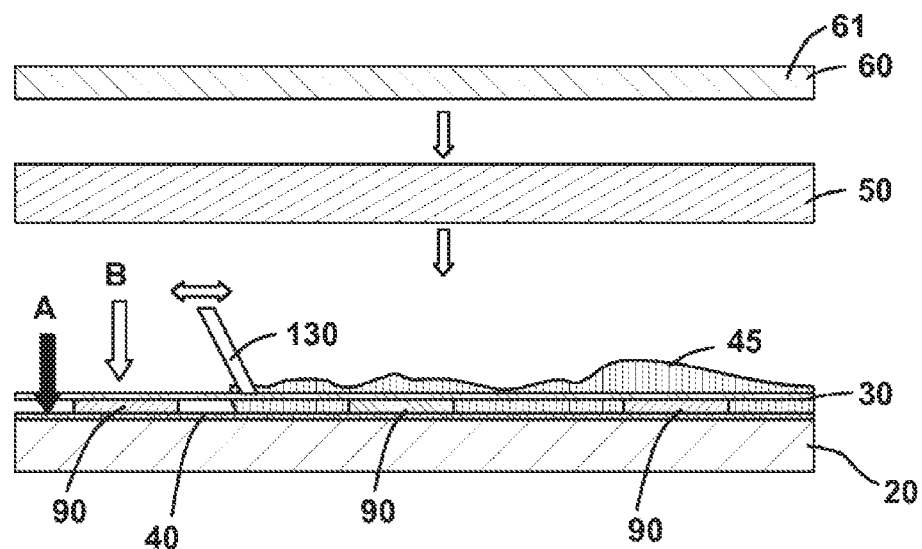
FIG. 2 shows a view of the flooring according to FIG. 1 during the production.

Thus, at first the sensor elements 81, the localization elements 80 and the connection lines 70, 71 are unprotected so to speak on their upper side when they are glued to the subfloor 20. In principle, this corresponds to the representation according to FIG. 2, in the left region, wherein the reinforcement fabric 30 which is explained below is not yet present.

Above the electric components 85, a reinforcement fabric 30 is in fact arranged, which protects the sensitive electric components 85 on their upper side facing away from the subfloor 20.

Here, different procedures are advantageous, namely:

First, the reinforcement fabric 30 is arranged above the electric components 85, before a hardenable material 45 is introduced between the electric components 85 and above the components 85. For example, the mass of the hardenable material 45, as long as it is still fluid or pasty, is troweled in by means of a trowel 130.

Moreover, it is possible that at least some of the hardenable material 45 or all of the hardenable material 45 is first poured onto the adhesive layer 40 and the components 85, before the reinforcement fabric 30 is, for example, troweled or pressed by means of a trowel tool 130 or another processing tool into the still soft mass of the material 45.

In the two cases mentioned above, the components 85 are protected on the upper side by the reinforcement fabric 30, when the trowel tool 130 or another processing tool is used. The processing tool can thus not damage the component elements 85.

In the above-mentioned processing of the hardenable material 45, the work is preferably carded out wet-in-wet, that is to say the adhesive layer 40 should not yet be hardened before the hardenable material 45 is introduced. Thus, on the one hand, the adhesive layer 40 forms a bonding course with the subfloor 20, and, on the other hand, the hardenable material 45 forms a bonding course with the adhesive layer 40 and the components 85. A homogeneous mass forms.

It should be mentioned here that the material of the adhesive layer 40 is advantageously the same as the hardenable material 45, for example, a synthetic resin material, for example, epoxy resin material, polyurethane resin material, acrylic resin material or the like.

When the hardenable material 45 is hardened, it reliably encapsulates components 85, so that mechanical loading on the components 85 is at least largely prevented.

Advantageously, the hardenable material 45, when it is hardened, forms a homogeneous, continuous joint-free layer above the components 85.

Moreover, it is advantageous that the hardenable material 45 represents a moisture barrier, so that, for example, no moisture can reach the components 85 from above. Said components are thus as it were hermetically covered and protected from above.

Above the flooring 10 which to that extent is completely produced or, for example, only partially produced, additional components can be arranged, for example, an elastic layer 50. The elastic layer 50 comprises, for example, a rubber granulate, in particular in sheet form. The elastic layer 50 acts as a damping layer or resilient layer, even if above the elastic layer 50, a top layer 60 in the form of, for example, a hard layer 61, a hard floor, linoleum, carpet or the like is arranged additionally. Any impacts acting from above on the flooring 10 are thus cushioned. Moreover, the use of the flooring 10 is very ergonomic, because it is resiliently springy. The flooring 10 can thus provide, for example, sound damping, step sound damping or the like.

It should be mentioned here that the elastic covering 50 represents an option which is advantageous. For example, it is possible for the hard layer 61 to be arranged without the intermediate elastic covering 50, in particular directly, above the hardenable material 45.

The hard layer 61 can also for example comprise or be formed by synthetic resin, for example, epoxy resin, polyurethane resin, acrylic resin or the like. Advantageously, the modulus of elasticity of the hard layer 61 is identical to that of the elastic layer 50.

The hard layer 61, on its upper side, has a pressure resistance of at least 35 N/mm2, preferably at least 40 N/mm2, particularly preferably at least 45 N/mm2. The hard layer 61 can thus readily support the weight of the vehicle 100.

The reinforcement fabric 30 comprises, for example, longitudinal fibers 31 and transverse fibers 32; advantageously, the reinforcement fabric 30 is made from a glass fiber material. Preferably, the reinforcement fabric 30 is not electrically conductive, so that the functions of the connection lines 70, 71 and of the localization elements 80 and of the sensor elements 81 as well as of the electrical components 90 are not influenced by the reinforcement fabric 30.

Figure 5:
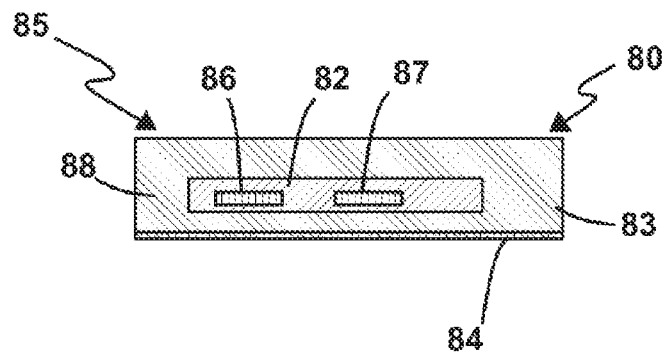
FIG. 5 shows a diagrammatic cross-sectional view through an electric component, for example, a localization element, of the flooring according to the above figures.
Figure 6:
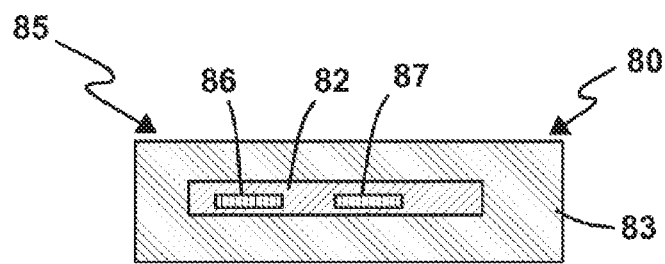
FIG. 6 shows a diagrammatic top view onto the component or localization element according to FIG. 5.

In FIG. 5, the localization element 80 is represented in detail. The localization element 80 comprises the RFID tag which is arranged in a protective capsule 83. The protective capsule 83 has, for example, an adhesive layer 84 which is suitable for fastening on the reinforcement fabric 30 and/or the subfloor 20 or the lining material 43. An additional adhesive layer can of course be provided, for example, on the upper side of the protective capsule 83, opposite the adhesive layer 85.

The protective capsule 83 advantageously consists of a foam material 88, in particular polyurethane. Thus, the protective capsule 83 is in a certain manner resilient, so that it can cushion or absorb the impacts or force effects, for example, due to the trowel tool 130. As a result, the sensitive RFID tag is not damaged.

Advantageously, it is provided that the localization element 80 is sheathed on all sides by the foam material 88. However, it would also be conceivable that the localization element 80 or another electronic or electric component in a flooring according to the invention is protected or sheathed by the foam material only on the upper side, i.e., the side facing away from the subfloor, only on the lower side, i.e., the side facing only the subfloor, or only laterally.

This technology, i.e., a protective capsule of the type of the protective capsule 83, can of course also be used with the sensor element 81.

Figure 7:
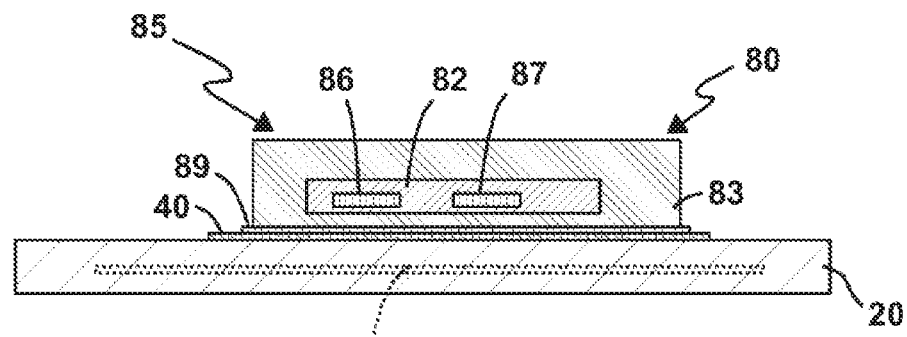
FIG. 7 shows a variant of the arrangement according to FIG. 5, but with a shielding.

Moreover, it is advantageous if, as represented in FIG. 7, an electric shielding 89 is provided between the electric component 85 and the subfloor 20. The shielding 89 prevents or avoids, for example, electric or electromagnetic and/or capacitive influences of a steel reinforcement 21 which forms a part of the subfloor 20 or is located under the subfloor 20. The shielding 89 comprises, for example, a shielding plate, a shielding fabric or the like. The shielding 89 can be glued, for example, by means of the adhesive layer 40 to the subfloor 20. It is possible that the shielding 89 forms a part of the electric component 85, in particular of the localization element 80.

The electric component 85 is glued, for example, by means of the adhesive layer 40 to the subfloor 20. The component 85 is preferably firmly bound to the shielding 89, for example, glued or pressed or both. The shielding 89 is glued by means of the adhesive layer 40 to the subfloor 20.

Figure 3:
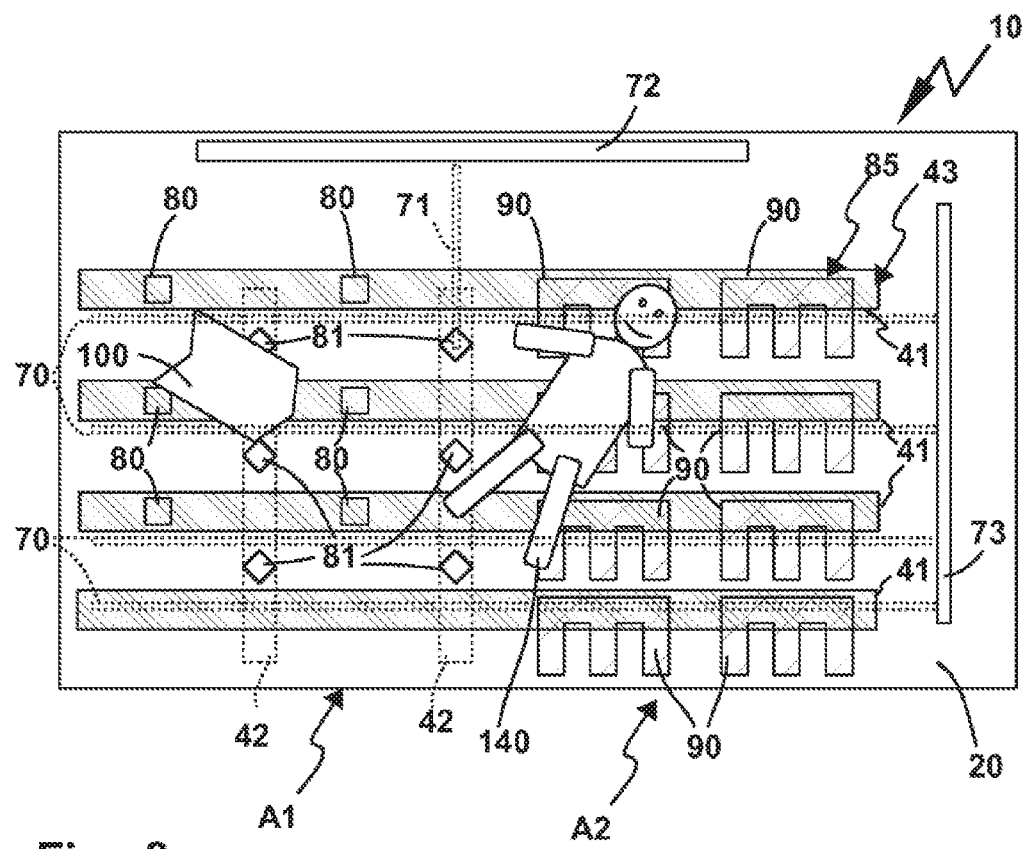
FIG. 3 shows a top view onto the flooring according to FIG. 2, approximately in accordance with an arrow A.

A particularly efficient design for producing a flooring 10 which detects in particular capacitive or capacitively acting object on the flooring 10, for example, the vehicle 100 or the person 140, is possible by means of the electric components 90. In FIG. 3, the components 90 are only represented in section A2. Naturally, they can also be provided in section A1.

Figure 8:
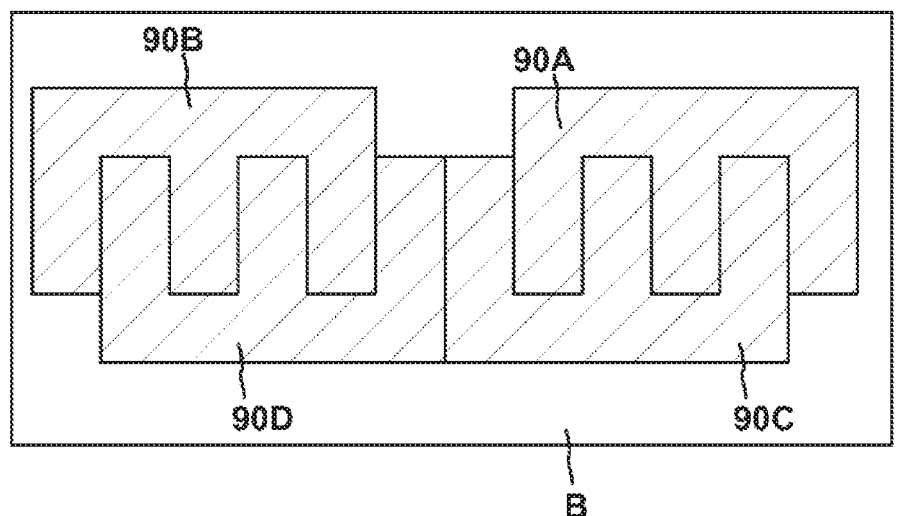
FIG. 8 shows a starting component for producing multiple electric components, which are represented in FIG. 9 in an exemplary configuration for use with the flooring.

The components 90 can be produced, for example, from a base body or base material B in a particularly effective manner. The base material B is, for example, a plate material which has a layered structure according to FIG. 10 and from which the components 90 are punched or cut out in another manner. In this way, for example, electric components 90A, 90B, 90C and 90D can be produced. The geometric contours of the components 90 are complementary to one another, so that they engage in one another in the as yet unseparated state according to FIG. 8 in such a manner that a section of the component 90 engages in a recess of the other component 90.

The electric components 90 have, for example, a base leg 91, from which lateral legs 92 protrude, for example, in a comb-like manner or in the shape of a letter E. Between the lateral legs 92, recesses 93 are provided. The recesses 93 extend from an upper side O to a lower side U of a respective component 90. The recesses 93, in the finished state of the flooring 10, are run through by the hardenable material 45, so that an optimal connection between the upper-side coveting of the components 90 by the hardenable material 45 and the subfloor 20 can be implemented.

Figure 9:
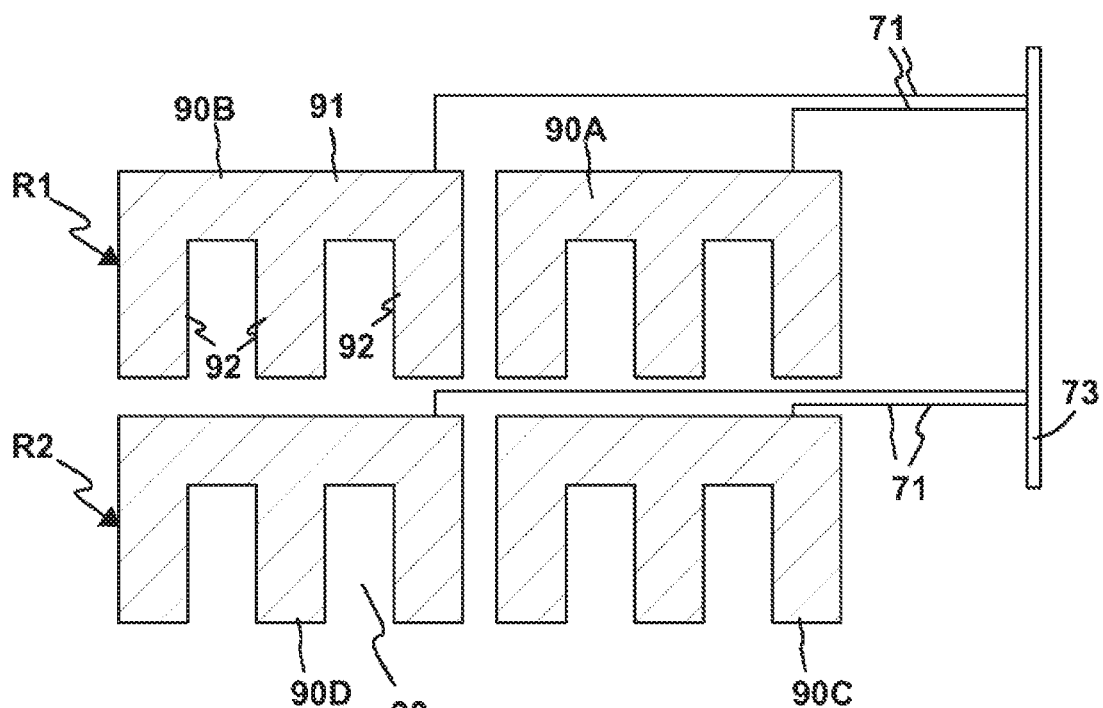

In FIG. 9, it is diagrammatically indicated that the electric components 90 are arranged in the flooring 10 in rows R1, R2 which are arranged next to one another and run in particular parallel to one another. In FIG. 3, as examples, 4 rows of electrical components 90 are indicated, wherein, naturally, additional rows or longer rows are of course possible.

It is also possible that only sub-regions of a flooring 10 are equipped with the components 90, while other sub-regions must do without the components 90. This is shown in particular by the different zones of the flooring 10 according to FIG. 3 where the localization elements 80 and sensor elements 81 are arranged in a section A1 and the components 90 are arranged in the other section A2. However, it is of course possible to use a mixture, i.e., it is possible that localization elements 80 and/or sensor elements 81 are also arranged in section A2 of the components 90. Thus, a multifunctional sensor detection is possible.

Figure 4:
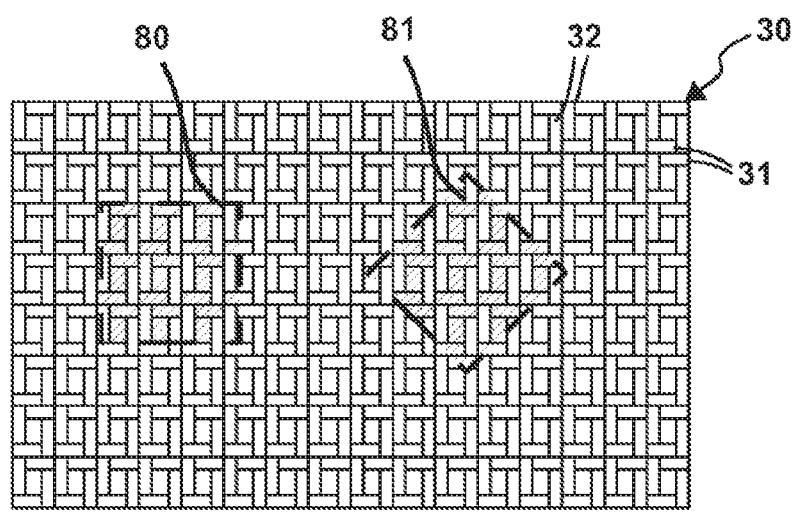
FIG. 4 shows a top view onto the flooring according to FIG. 2, approximately in accordance with an arrow B.

The components 90 are advantageously also covered by the reinforcement fabric 30, which, for reasons of clarity, is not represented in FIG. 4.

The components 90 comprise a plate-like support 94. On the support 94, on the upper side and the lower side, electrical conductor surfaces 95, 96 are arranged, which in turn are covered by a protective layer or a protective lacquer 97. Thus, the conductor surfaces 95, 96 are arranged sandwiched between the protective lacquer 97 or the protective lacquer layers 97 and are protected.

Optionally and advantageously, an adhesion promoter 98 is arranged on one or both of the flat sides of a component 90. The adhesion promoter 98 comprises, for example, a grit, granulate or the like, as indicated in FIG. 10.

The conductor surface 96 is used as a shielding and advantageously is connected to a shielding 76 of a shielded line or coaxial line 74, which is used as connection line 70. The core or the central conductor 75 of the shielded lines or coaxial lines 74 is electrically connected to the conductor surface 95, which is used as capacitor surface. A respective capacitance of the conductor surface 95, which is influenced by the objects in the form of, for example, the vehicle 100 and/or the person 140, is evaluated by the evaluation device 73.

The structural elements 90 have a relatively large surface, coveting, for example, in each case surface areas of approximately 20×30 cm or 20×20 cm.

The structural elements 90 are electrically separate from one another. Between the components 90, the electrically hardenable material 45 can bind to the subfloor 20.

An electric component 190 according to FIG. 11 comprises a base body 192. For example, the electric component 190 has an electrical conductor surface 195 which can be connected to the evaluation device 73, for example, by means of a connection line in the manner of the connection line 70. The component 190 has multiple recesses 193 in the form of passage openings 194, through which the hardenable material 45 can reach from the upper side O of the component 190 its lower side U and thus establish an optimal connection with the substrate or subfloor 20. The recesses 193 are represented in the drawing as annular or circular. However, a keyhole-like contour or other similar contours would also of course be possible. The recesses 193 could also be designed as polygonal recesses, for example, rectangular, diamond shaped recesses.

The electric component 190 can be used as replacement for or in addition to an electric component 90, for example, can be lined up in the arrangement according to FIG. 3.

An electric component 290 according to FIG. 12 has a meandering form. The component 290 comprises legs forming an angle, in particular a right angle, with respect to one another, namely a base leg 291 from which lateral legs 292 protrude. A lateral leg 294 adjoins the lateral leg 292 forming a right angle and extends parallel to the base leg 291. From the lateral leg 294, in turn a leg 295 protrudes at an angle, in particular a right angle, and extends advantageously parallel or inclined at a slant (not represented in the drawing) with respect to the lateral legs 292. Between the leg 295 and one of the lateral legs 292, a section 296 of a substantially U-shaped recess 293, which also comprises additional sections 297, 298, extends, the additional sections being each at an angle, in particular a right angle with respect to the section 296. The recess 293 is run through by the hardenable material 45. In this embodiment example, it is clear that a recess according to the invention can also comprise multiple sections forming an angle with respect to one another, which can improve the hold of the respective component, here the component 290, within the flooring 10.

In FIG. 13, multiple components 290 are arranged in rows R1 and R2 (additional rows and/or longer rows are possible) or a grid RA. As needed, the components 290 can be arranged in identical rotation angle orientations or in different rotation angle orientations as in the drawing, for example, in order to change the quality of the measurement thereof or the like.

Instead of the components 90, 190 or 290 or in addition to said components, an electric component 390 represented in FIG. 14 can also be used. As in the case of components 90, 190 and 290, in the case of component 390, connection lines of the type of and/or in the connection manner of the connection line 70 and/or 71 are not included or are indicated only partially in the drawing to simplify the representation, but they are advantageously present.

The component 390 has, for example, a Christmas-tree like structure or geometry. The component 390 has a base leg 391, from which an arm 392 protrudes at an angle, for example, a right angle. The arm 392 is arranged between lateral arms 391A, 391B of the base leg 391, in particular in the center. On the arm, branches so to speak or lateral legs 394A, 394B of a body 394 which extends parallel to the base leg 391, and lateral legs 395A, 395B of a body 395 which also extends parallel to the base leg 391 are provided. The lateral legs 395A, 395B are shorter than the lateral legs 394A, 394B and these legs in turn are shorter than the lateral arms 391A, 391B. Thus, in principle, the result is a triangular envelope or a substantially triangular peripheral contour around the electric component 390, which enables a space-saving, interleaved or mutually engaging arrangement of the components 390 according to FIG. 15, for example.

Moreover, the hardenable material 45 in recesses 393B between the lateral legs 395A, 395B and the lateral legs 394A, 394B and in recesses 393B between the lateral arms 391A, 391B and the lateral legs 394A, 394B can ensure a firm hold of the component 390 on the substrate or subfloor 20.

The components 390 can be arranged, for example, in a mutually facing, mutually engaging configuration or arrangement according to FIG. 15 with rows R1 and R2. For example, the shorter lateral legs 395A, 395B of components 390A engage in gaps between the longer lateral legs 394A, 394B or the lateral arms 391A, 391B. The rows R1 and R2 comprise, for example, components 390A, 390B arranged next to one another.

In an electric component 490 diagrammatically indicated in FIG. 16, a serpentine geometry is implemented, in which longer legs 491 and shorter legs 492 are provided. In each case, two longer legs 491 delimit recesses 493A, 493B which extend, for example, parallel to another between adjacent longer legs 491 and are connected on one side by a shorter leg 491.

The components 290, 390, 490 have, for example, a similar structure to the component 90 with regard to the support and/or the electrical conductor surfaces 95 and/or 96 and/or one or more protective lacquer layers 97 or other coverings for the conductor surfaces. Therefore, the base material B can thus be used for producing the component 290, 390, 490.

In a component comprising laterally open recesses or marginal recesses, additional recesses in the form of perforation openings can also of course be present, as indicated in the component 390 according to FIG. 14. For example, this component can have a recess 193 in the form of a circular passage opening 194 of the type of element 190. However, other recesses are also possible, for example, a Christmas-tree-like recess or passage opening 380A or a polygonal, for example, hexagonal, recess or passage opening 380B.

Figure 17:
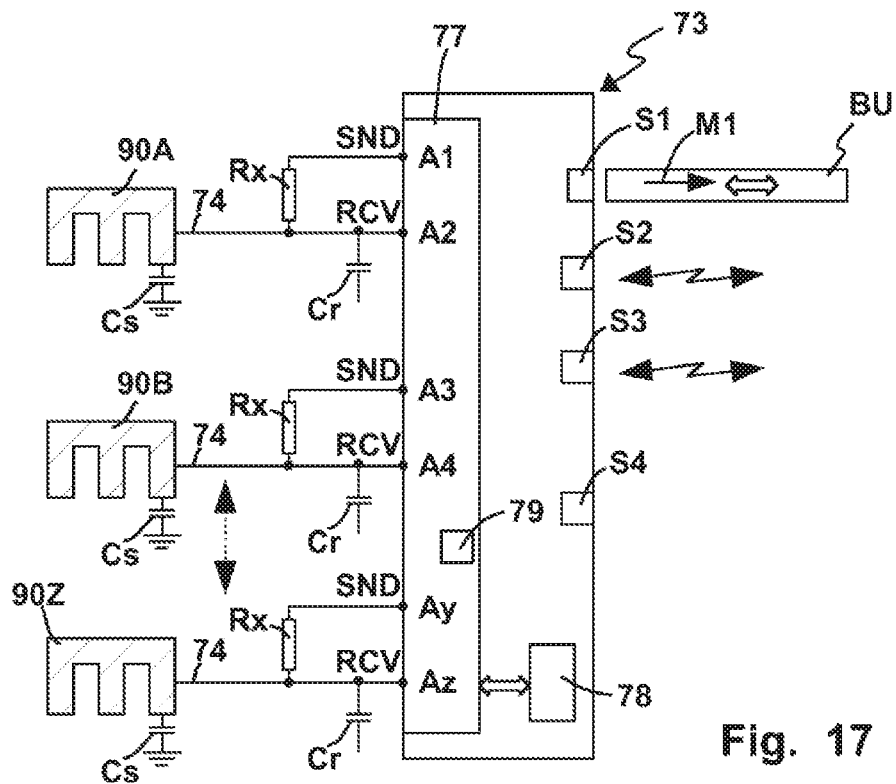
FIG. 17 shows a diagrammatic circuit with an evaluation device.

A circuit represented in FIG. 17 comprises the electrical components 90A, 90B and additional electrical components of identical design or identical type, for example, the electric components 90C, 90D (not represented) which will generally be referred to as component 90Z as it were. Instead of the components 90, another construction or design could always be used, for example, in the manner of the electric components 190, 290, 390 or 490.

The electric components 90A, 90B, 90Z (as well as additional electric components of this type or similar type) are capacitive sensors or operate as capacitive sensors. They could also be referred to as capacitors or capacitor components. The components 90 are connected via the already explained coaxial lines 74 to connections of a microprocessor 77 of the evaluation device 73, the functions of which are designated by SND (=send) and RCV (=receive). Thus, for example, the component 90A is connected via the shielded line or coaxial line 74 and a resistor Rx to a connection A1 having a send function (SND) and directly or via a resistor, not represented, to a receive connection A2 (RCV). On the component 90A, for example, with regard to its conductor surface 95, a measurement capacitance Cs is present, for example, with respect to grounding. On the receive connection A2, an additional capacitance Cr can optionally be present. The capacitance Cr can obviously be, for example, a natural or intrinsically present capacitance as it were, but it can also be or comprise a capacitor component provided in order to improve the measurement quality. Appropriately, the components 90B as well as other components referred to as components 90Z are also connected to the microcontroller 77 or its output connections A3, AY and input connections A4 and AZ.

The evaluation device 73, in particular microcontroller 77, now detects the respective capacitance Cs of a component 90A, 90B or 90Z by a change of its status and/or its voltage on the respective send connection SND (A1, A3, AY), for example, from logic 0 to logic 1 or vice versa, and counts the time until a status change or voltage change on the receiving connection A2, A4 or AZ is measured.

Figure 18:
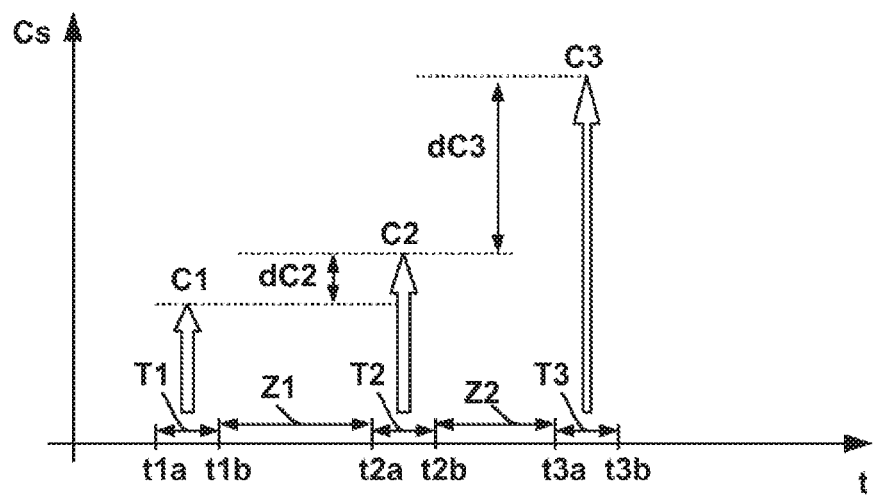
FIG. 18 shows a diagram for the representation of capacitance values detected by the circuit according to FIG. 17.

Such a measurement or series of measurements, for example, in the component 90A, is indicated as an example in FIG. 18. Thus, for example, between times t1a and t1b, a capacitance C1 arises, i.e., within a measurement time span T1, the evaluation device 73 detects, for example, a capacitance C1 of the component 90A.

Between times t2a and t2b, the evaluation device 73 in fact detects within a measurement time span T2 a capacitance C1 which is higher than the capacitance C1 by a difference dC2. But this higher capacitance C2 or the difference dC2 is only the result of a slow increase of the capacitance or of the capacitance value of the component 90A due to environmental influences, for example, moisture influences or the like. This is a type of capacitance drift. The change of the capacitance C2 with respect to the capacitance C1, that is to say the difference dC2, relates to a long time period Z1, wherein Z1 is the time span between the times t1b and t2a. Naturally, between these times, additional measurements can occur. The change in capacitance, the difference dC2, is relatively small in comparison to the long time span Z1. Therefore, the capacitance value gradient dC2/dZ1 is thus small.

However, if, between times t3a and t3b, within a measurement time span T3, the capacitance value is C3 which is greater than the capacitance value C2 by an amount dC3, the evaluation device 73 sends, for example, via a bus interface S1, in particular a USB interface, a message signal M1 to a bus BU. The increase of the capacitance value C3 in comparison to the capacitance value C2 within a relatively short time is very high, which is interpreted by the evaluation device 73 as a presence of an object, in particular of a human, in the area of the component 90 A. The increase of the capacitance value C3 in comparison to C2, that is to say the value dC3, is with respect to a time span Z2 between times t2b and t3a, so that a capacitance value gradient dC3/dZ2 results. The capacitance value gradient dC3/dZ2 is greater, for example, by a factor X, than the capacitance value gradient dC2/dZ1. The evaluation device 73 compares the factor X, for example, with a specified value and then, for example, when the factor X is greater than the specified value, sends the message signal M1. Another procedure provides that the evaluation device 73 compares the respective capacitance value gradient dC2/dZ1 or dC3/dZ2 and additional capacitance value gradients with a predetermined or adjustable comparison value, for example, which can be parameterized at one of the interfaces S1-S4, depending on this comparison, it sends or does not send the message signal M1.

The measurements represented in FIG. 18 are to be understood as examples. It is advantageous if the evaluation device 73 performs a plurality of measurements within a minimum of time, for example, 30-50 measurements per second.

Advantageously, the evaluation device 73 also comprises an evaluation logic 79. The evaluation logic 79 is designed, for example, as a program which is stored in a memory 78 of the evaluation device 73 and which can be read in by the microprocessor 77. The evaluation logic 79 comprises, for example, program codes containing commands that can be executed by the microprocessor 77. The evaluation logic 79 comprises, for example, logic links, conditions and the like between capacitance values of the components 90, by means of which the evaluation device 73 changes, for example, the measurement signal M1, depending on the fact that the capacitance values of adjacent components 90 change in a predetermined manner and/or in a predetermined way. It is only when, for example, in the case of two directly adjacent components 90, for example, components 90A and 90B, the capacitance values increase simultaneously or substantially simultaneously by a predetermined amount, that the evaluation logic 79, and thus also the evaluation device 73, interprets this as a capacitance change caused, for example, by a human, a robot or the like and generates the message signal M1 as a function thereof.

Preferably, the evaluation device 73 comprises additional interfaces, for example, an interface S2 for the connection to a wireless LAN, an interface S3 as a wireless interface for the communication with nearby communication partners, for example, via Bluetooth, NFC or the like, as well as an interface S4 for wired communication with a network, for example, a LAN. The interface S4 is, for example, an Ethernet interface.

The invention claimed is:

1. A flooring as a covering for a subfloor, wherein the flooring comprises a layer made from a hardenable material which is hardened when the flooring is in the finished state and in which at least one electric component is embedded, wherein the electric component comprises a lower side facing the subfloor when in the mounted position, and an upper side opposite the lower side and wherein the at least one electric component comprises, on at least one surface section, an adhesion promoter for the hardenable material and at least one recess which extends from its upper side to its lower side,
    wherein the at least one electric component comprises a base leg and at least one lateral leg protruding from the base leg, wherein, between the base leg and the lateral leg, the at least one recess is provided.

2. A flooring as a covering for a subfloor, wherein the flooring comprises a layer made from a hardenable material which is hardened when the flooring is in the finished state and in which at least one electric component is embedded, wherein the electric component comprises a lower side facing the subfloor when in the mounted position, and an upper side opposite the lower side and wherein the at least one electric component comprises, on at least one surface section, an adhesion promoter for the hardenable material and/or at least one recess which extends from its upper side to its lower side,
    the flooring further comprising at least one further electric component of identical contour compared to that of the at least one electric component, which engages at least partially in the recess of the at least one electric component.

3. The flooring according to claim 1, wherein the at least one electric component has a flat shape and/or is plate-like and/or the upper side and/or the lower side is/are substantially planar.

4. The flooring according to claim 1, wherein the base leg and at least two lateral legs form an overall comb-like structure or contour.

5. The flooring according to claim 1, wherein the at least one lateral leg protrudes at a right angle or at angle between 80 and 110° from the base leg.

6. The flooring according to claim 1, wherein the at least one electric component forms a part of an arrangement of multiple electric components of identical contour and/or of identical design, which are laid out in a grid or a matrix.

7. The flooring according to claim 6, wherein the electric components are arranged in a row arrangement, and wherein the flooring comprises multiple rows with electric components of identical structure or identical contour.

8. The flooring according to claim 6, wherein the electric components are arranged with mutual spacing and/or do not overlap.

9. The flooring according to claim 1, wherein the at least one electric component comprises a plate-like support.

10. The flooring according to claim 1, wherein the at least one electric component or at least one electric component comprises at least one electrical conductor surface extending in a plane parallel to the upper side or lower side and/or a conductor surface made of aluminum or copper.

11. The flooring according to claim 1, wherein the adhesion promoter has a granular structure in the manner of an abrasive material or abrasive paper, and/or a coating capable of binding to the hardenable material.

12. The flooring according to claim 2, wherein the at least one electric component comprises at least one recess formed by a lateral recess and/or a marginal recess and/or a passage opening.

13. The flooring according to claim 12, wherein, viewed from the upper side and/or the lower side, the at least one electric component is in the shape of an L, a U or an E.

14. The flooring according to claim 12, wherein the at least one electric component has a meandering or serpentine shape.

15. A flooring as a covering for a subfloor, wherein the flooring comprises a layer made from a hardenable material which is hardened when the flooring is in the finished state and in which at least one electric component is embedded, wherein the electric component comprises a lower side facing the subfloor when in the mounted position, and an upper side opposite the lower side and wherein the at least one electric component comprises, on at least one surface section, an adhesion promoter for the hardenable material and/or at least one recess which extends from its upper side to its lower side, wherein the at least one electric component or at least one electric component comprises at least one electrical conductor surface extending in a plane parallel to the upper side or lower side and/or a conductor surface made of aluminum or copper, and wherein a first electrical conductor surface of the electric component forms a capacitor surface, and a second electrical conductor surface located close to the lower side, forms an electric shielding.

16. A flooring as a covering for a subfloor, wherein the flooring comprises a layer made from a hardenable material which is hardened when the flooring is in the finished state and in which at least one electric component is embedded, wherein the electric component comprises a lower side facing the subfloor when in the mounted position, and an upper side opposite the lower side and wherein the at least one electric component comprises, on at least one surface section, an adhesion promoter for the hardenable material and/or at least one recess which extends from its upper side to its lower side, wherein the at least one electric component or at least one electric component comprises at least one electrical conductor surface extending in a plane parallel to the upper side or lower side and/or a conductor surface made of aluminum or copper, and wherein the at least one electrical conductor surface is entirely or substantially covered by a protective lacquer or a protective coating, and wherein the electrical conductor surface is arranged between the plate-like support and the protective lacquer of the protective coating.

17. A flooring as a covering for a subfloor, wherein the flooring comprises a layer made from a hardenable material which is hardened when the flooring is in the finished state and in which at least one electric component is embedded, wherein the electric component comprises a lower side facing the subfloor when in the mounted position, and an upper side opposite the lower side and wherein the at least one electric component comprises, on at least one surface section, an adhesion promoter for the hardenable material and/or at least one recess which extends from its upper side to its lower side, wherein the at least one electric component is connected by means of its lower side to a subfloor by gluing, and a reinforcement fabric covers the at least one electric component by means of its side facing away from the subfloor, so that the at least one electric component is covered on the upper side by the reinforcement fabric and the hardenable material.

18. A flooring as a covering for a subfloor, wherein the flooring comprises a layer made from a hardenable material which is hardened when the flooring is in the finished state and in which at least one electric component is embedded, wherein the electric component comprises a lower side facing the subfloor when in the mounted position, and an upper side opposite the lower side and wherein the at least one electric component comprises, on at least one surface section, an adhesion promoter for the hardenable material and/or at least one recess which extends from its upper side to its lower side, wherein the at least one electric component is arranged on a lining material, wherein the lining material with the electric component arranged thereon is glued to the subfloor or unfinished floor, wherein the lining material comprises or is formed by a reinforcement fabric.

19. A flooring as a covering for a subfloor, wherein the flooring comprises a layer made from a hardenable material which is hardened when the flooring is in the finished state and in which at least one electric component is embedded, wherein the electric component comprises a lower side facing the subfloor when in the mounted position, and an upper side opposite the lower side and wherein the at least one electric component comprises, on at least one surface section, an adhesion promoter for the hardenable material and/or at least one recess which extends from its upper side to its lower side, wherein the at least one electric component comprises an adhesive layer for application on a reinforcement fabric or the subfloor.

20. The flooring according to claim 19, wherein the hardenable material comprises or is formed by a mineral material, and/or a synthetic resin material, and/or a dispersion adhesive material.

21. An electric component for a flooring as a covering for a subfloor, wherein the flooring comprises a layer made from a hardenable material which is hardened when the flooring is in the finished state and in which at least one electric component is embedded, wherein the electric component comprises a lower side facing the subfloor when in the mounted position, and an upper side opposite the lower side and wherein, on at least one surface section, the at least one electric component comprises an adhesion promoter for the hardenable material and/or at least one recess which extends from its upper side to its lower side, and wherein the at least one electric component comprises an adhesive layer for application on a reinforcement fabric or the subfloor.

* * * * *